MULTISTATION REMOTELY-CONTROLLED PHONOGRAPHIC SYSTEMS

Filed March 29, 1952

2 Sheets-Sheet 1

INVENTOR
William W. Logan
BY Henry Lanahan

Sept. 28, 1954 W. W. LOGAN 2,690,480

MULTISTATION REMOTELY-CONTROLLED PHONOGRAPHIC SYSTEMS

Filed March 29, 1952

2 Sheets-Sheet 2

INVENTOR
William W. Logan
BY
Henry Lanahan

Patented Sept. 28, 1954 2,690,480

UNITED STATES PATENT OFFICE 2,690,480

MULTISTATION REMOTELY-CONTROLLED PHONOGRAPHIC SYSTEMS

William W. Logan, Glen Ridge, N. J., assignor to Thomas A. Edison, Incorporated, West Orange, N. J., a corporation of New Jersey Application March 29, 1952, Serial No. 279,345

14 Claims. (Cl. 179—100.1)

Figure 1:
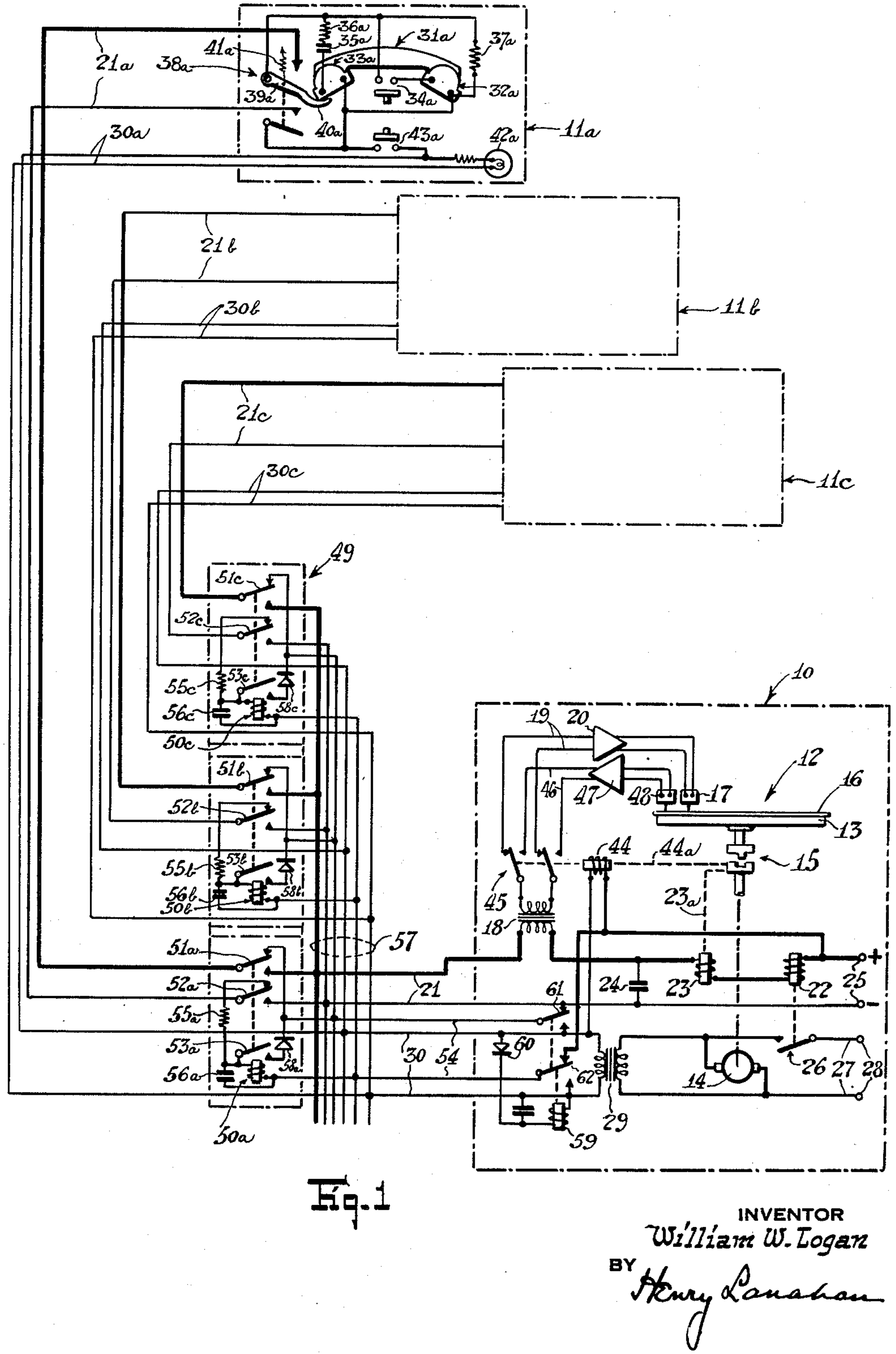

This invention relates to multistation remotely-controlled phonographic systems adapted to afford privacy, and/or freedom from interference from others, to each user of the system, the term "user" being herein employed to mean the remote operator who has activated the phonographic machine for use, and the term "use" being herein employed to mean to record and/or to reproduce and to start and stop the machine at will.

This invention is especially applicable to dictation-recording systems of the type disclosed in the pending Somers et al. application Serial No. 247,244, filed September 19, 1951, and is in some respects an improvement on the second embodiment of such recording system adapted to afford privacy to the user and broadly claimed in my pending application Serial No. 262,403, filed December 19, 1951, both of which applications have common ownership with the present application.

The dictation-recording system described in the Somers et al. application comprises a plurality of remote operators' stations connected in parallel with a single recording machine, the connections leading from each remote station comprising a branch communication and control circuit and a branch signal circuit. In this system, a warning is given at all idle remote stations through the respective branch signaling circuits when the system is in use, but such warning does not preclude those at idle stations from "listening in" to the dictation being recorded or reproduced by the user of the system, or from talking into their respective microphones to interfere with such recordation or reproduction, or from manipulating their controls to interfere with the intended control of the system by the user.

An object of the present invention is to provide an improved circuit arrangement for affording privacy to each user of such system.

More particularly, it is an object to provide an improved form of the privacy arrangement disclosed in my pending application aforementioned, which does not require the use of any privacy control relays in the communication circuit during use of the system.

Another object is to provide a privacy arrangement for such dictation-recording systems which is flexible in that it enables the additional components required for achieving privacy to be placed at either the remote or attendant's stations or at any suitable position in-between.

Another object is to achieve privacy for the user of such phonographic system as is above referred to without having to alter either the remote operators' or attendant's stations.

Briefly, the principle of operation of the present system is as follows: All branch communication circuits leading to the respective remote stations are normally connected to a D.-C. source of potential through a side circuit and respective relays operable only on direct current. When any one of the branch communication circuits is closed at the remote station, the respective relay is operated to connect that branch communication circuit to the audio circuit of the machine and, at the same time, re-connection of that relay in the side circuit is made through a rectifier poled so as to hold the relay in operated position. The connection of the branch communication circuit to the audio circuit completes the latter and causes energization thereof to operate an activating relay for the phonographic machine. As a result of this activation, the side circuit is switched to an A.-C. source of potential. The operated relay is maintained in operated position because of its connection in the side circuit through the aforementioned rectifier, but all other relays corresponding to the idle stations will not operate if the respective branch circuits are thereafter closed while the machine is in use because these relays are inherently inoperable by alternating current and do not have their respective rectifiers connected in the side circuit. These other relays being inoperable, the operator at the idle station will merely receive a heavy warning signal to apprise him that the system is not available for use.

These and other objects and features of my invention will be apparent from the following description and the appended claims.

Figure 2:
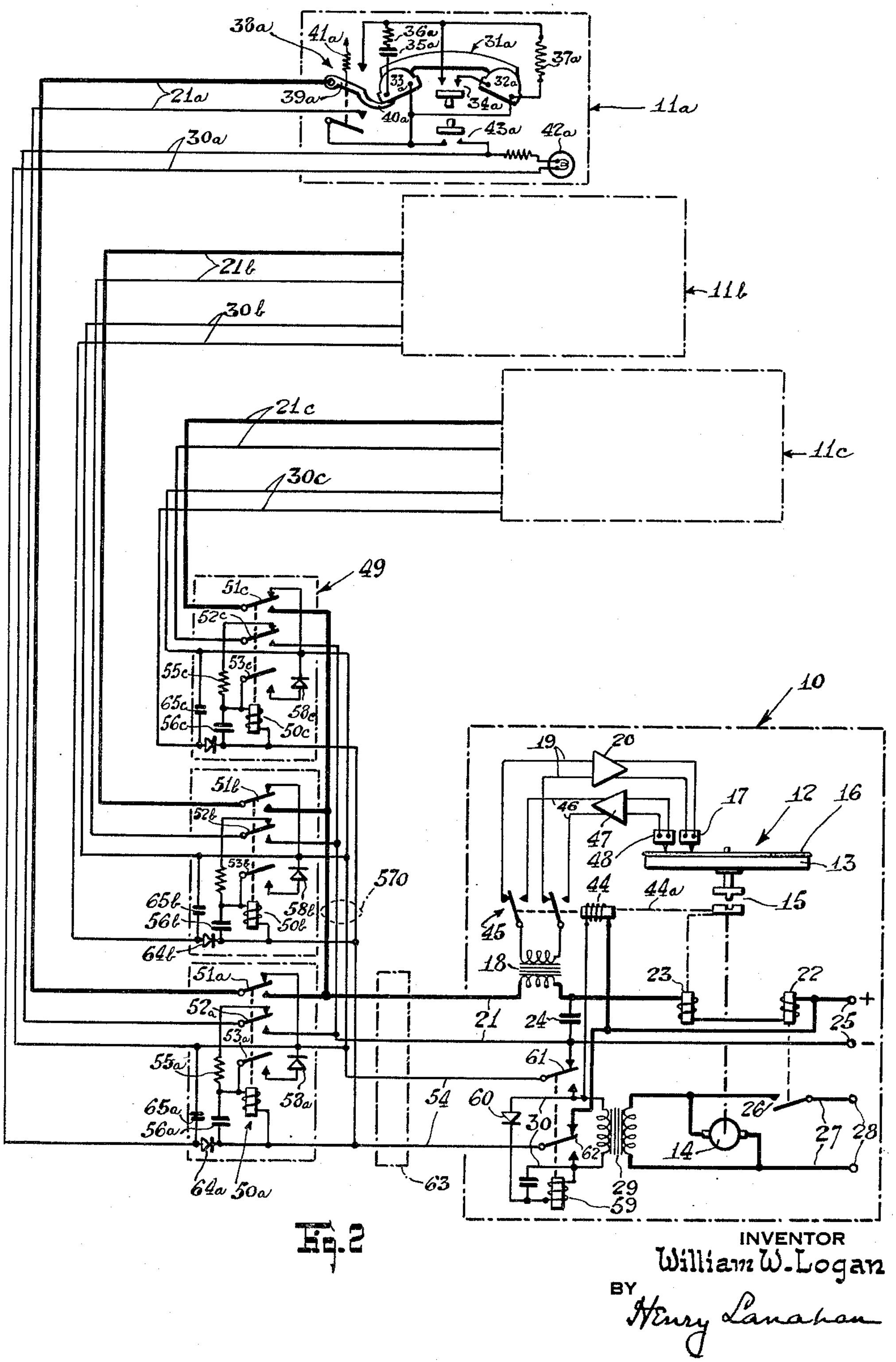

In the description of my invention reference is had to the accompanying schematic drawings, of which: Figure 1 is a drawing showing circuits and mechanism according to one embodiment of my invention; and Figure 2 is a drawing similar to that of Figure 1 showing a modification of my invention.

Since the present invention has special application to a dictation-recording system of the type abovementioned, it is herein particularly described in connection with such recording system, but only such portions of that system are shown as need be considered for the purposes of this invention. For a detailed description of such recording system, reference may be had to the Somers et al. application aforementioned.

In Figure 1 there is a dictating system comprising a home or attendant's station 10 and a plurality of identical remote operators' stations of which there are three shown by way of example, these stations being referred to as 11a, 11b and 11c respectively. At the attendant's station there is a dictating machine 12 (fractionally shown) which comprises a turntable 13 driven by a motor 14 through a clutch 15. The turntable carries a record disc 16 engaged by a recording unit 17. Audio speech-representing currents are fed to this recording unit through an audio transformer 18 and a circuit 19 including an amplifier 20.

The attendant's station is provided with a communication or audio circuit 21 which serially includes the primary of the audio transformer 18. This communication circuit is used also to control the machine, and for the latter purpose it includes two serially-connected relays 22 and 23. Audio currents in the communication circuit are by-passed around these relays by a condenser 24. The communication circuit is energized from a low-voltage D.-C. power source (not shown) which is connected to the terminals 25 marked + and − respectively. The relays are adapted to operate at different levels of direct current established selectively at the operators' stations as will appear. Relay 22 has contacts 26 operated at the lower current level to close the power circuit 27 serially including the motor 14. This power circuit is energized from an A.-C. source (not shown) which is to be connected to the terminals 28. The second relay 23 is adapted to operate at a higher level of current and controls the clutch 15 as represented diagrammatically by the tie-line 23*a*. These relays may of course perform still other control functions which need not however be herein described. For the present purposes it will be understood that the motor 14 is started when the relay 22 is operated and that the clutch 15 is engaged to start rotation of the turntable 13 when the relay 23 is operated. An energization of the communication circuit 21 at the lower current level, with resultant starting of the motor 14 or other conditioning of the machine for immediate start-stop operation, is herein considered as an activation of the dictating system.

In the power circuit 27 and in shunt with the motor 14 there is a voltage stepdown transformer 29 the secondary of which is connected to two outgoing leads constituting a signal circuit 30 for the dictating system. This signal circuit is accordingly energized whenever the dictating system is activated.

The operators' stations 11*a*, 11*b* and 11*c* are identical and a description of the station 11*a* will suffice for all three. Corresponding elements of these stations are given the same reference numerals but with the suffix letters of the respective stations.

The station 11*a* has a handpiece 31*a*, for example, of the usual telephone variety including, as transducer elements, a carbon button microphone 32*a* and a receiver 33*a*. The microphone 32*a* is connectable in a branch 21*a* of the communication circuit 21 through a manual switch 34*a* and a double-pole on-off station switch 38*a* having one pole in each line of the branch communication circuit. Both poles are closed with their respective contacts when the station switch is in "On" position and are broken therefrom when the switch is in "Off" position. The receiver 33*a* is connectable in this same branch circuit by closure of the station switch, but this connection is made through a condenser 35*a* and resistor 36*a*. Additionally, there is a resistor 37*a* at the remote station which is connected directly across the branch communication circuit 21*a* when the station switch is closed. This resistor completes the branch communication circuit upon closure of the station switch to cause current to flow at the lower current level for operating the relay 22, as will appear.

At least one of the movable pole elements 39*a* of the station switch 38*a* is associated with the support for the handpiece 31*a*; for example, this pole element may have a hook-shaped end portion 40*a* adapted to receive the handpiece and support it in idle position when the station is not in use. The pole elements of the station switch are urged upwardly into closed positions by a spring 41*a*, but when the handpiece is placed on the support 40*a* the weight thereof is sufficient to overcome the spring and to hold the station switch open.

At the remote station 11*a* there is also a normally-open manual switch 43*a* operable to interconnect the negative side of the branch communication circuit 21*a* with one line of the signal circuit 30*a*. As will appear, this connection will result in energization of a relay 44 at the attendant's station having a double-pole switch 45 for shifting the connection of the audio transformer 18 from the recording lines 19 to a pair of reproducing lines 46 leading through an amplifier 47 to a reproducer 48. This reproducer normally engages the record disc and is moved with the recorder 17 at a trailing distance therefrom as is common in phonographic machines. (It will be understood that the recorder 17 and reproducer 48 may be lifted from the record disc as for purposes of making a record change, but that the means for doing this need not be herein described.) The relay 44 has also an operative connection with the clutch 15 as represented by the tie line 44*a*, which is for the purpose of causing the clutch to be engaged as the relay is operated. Thus, the audio circuit is connected to the reproducer and record rotation is started for playback when the remote switch 43*a* is closed.

The signal circuit 30, like the communication circuit 21, has a branch to each remote station designated by the reference numeral 30 with the suffix letter of the respective station. Serially connected in the branch 30*a* for the station 11*a* is a signal lamp 42*a* for producing a signal light at that station whenever the dictating system is in use. Similar signal lamps are provided at the stations 11*b* and 11*c*.

The communication circuit 21 has other branches 21*b* and 21*c* leading to the operators' stations 11*b* and 11*c* respectively, the same as is the case with the signal circuits. Except for a disabling relay system 49 provided in accordance with my invention to afford privacy to each user, the remote operators' stations would be connected permanently in parallel with the audio circuit at the attendant's station to permit a non-user to listen in to a user's dictation or reproduction or otherwise to interfere with the user's control of the phonographic system. However, this is prevented by the present invention. A feature of my invention is that one relay is provided for each remote station and is normally positioned to disconnect the branch communication circuit of that station from the audio circuit, but that as the branch communication circuit is closed it is connected by the respective station relay to the audio circuit to place the system in operable condition as from that remote station; at the same time all the other station relays are disabled so that they cannot connect any of the other branch communication circuits to the audio circuit while the system is in use.

The relay corresponding to each remote station just above referred to, is designated by the number 50 with the suffix letter of the respective remote station. Each such station relay has three switch pole members 51, 52 and 53 with the suffix letter of the respective relay. The pole members 51 and 52 are connected to the lines of the respective branch communication circuit. In the unoperated position of a station relay, these poles 51 and 52 connect the respective branch communication circuit to a circuit 54 connected to the D.-C. power source 25 and referred to as a "side" circuit as with respect to the audio circuit 21. When any one of the station relays is operated, it connects the respective branch communication circuit to the audio circuit 21. As will appear, this side circuit has branches to the switches of the respective station relays of which one line of each such branch serially includes the coil of the respective station relay and a resistor designated by the number 55 with the suffix letter of the respective relay. Each station relay is adapted for operation only on direct current. This may be accomplished by suitable design of the relay itself and/or by shunting each relay with a condenser designated by the number 56 with the suffix letter of the respective relay. This condenser has the further function of by passing alternating current around the coil of the relay for enabling warning signals to be transmitted to the idle stations, as will appear.

From the foregoing description it is apparent that there are an audio circuit 21, signal circuit 30 and side circuit 54 leading from the attendant's station. The parallel connections of the branch signal circuits to the signal circuit 30, and of the branch communication circuits to the side circuit 54 or audio circuit 21 are made through a six-wire conductor group 57.

When a remote operator, say the operator at station 11*a*, lifts his handpiece 31*a* from its support in preparation to using the phonographic system, he closes the respective station switch 38*a* to close his branch communication circuit 21*a* through the resistor 37*a*. Closure of his branch communication circuit causes direct current to flow from the D.-C. source 25 through the side circuit 54 and the respective station relay 50*a*. This direct-current flow operates the relay 50*a* to switch the connection of the branch communication circuit 21*a* from the side circuit 54 to the audio circuit 21. As this switching is done the energizing circuit of the station relay 50*a* via the respective branch communication circuit is broken; however, the closure of the switch pole 53*a* with its associated contact, which occurs as the station relay 50*a* is operated, serves to reconnect this relay in the side circuit 54 through a rectifier referred to by the number 58 with the suffix letter of the respective relay. Upon connection of the branch communication circuit 21*a* to the audio circuit 21, the latter is energized at the lower current level to cause the relay 22 to be operated. This relay closes switch 26 to connect the motor 14 and transformer 29 to the A.-C. source 28. The motor is therefore started to activate the phonographic system for use, it being understood that the amplifiers 20 and 47 are retained in operated condition while the system is at standby. The connection of the transformer 29 to the source 28 causes the signaling circuit 30 to be energized. As current is supplied to the signaling circuit, a relay 59 is energized through a rectifier 60. This relay has two switch poles 61 and 62 connected to the side circuit 54 and normally positioned to connect this side circuit to the D.-C. source 25. As this relay 59 is operated, these pole members are moved to switch the connection of the side circuit from the D.-C. source 25 to the signaling circuit 30. As this switching is done the operated relay 50*a* stays in operated position because it is already connected in the side circuit through the rectifier 58*a*. However, the other relays 50 corresponding to the remote stations not in use are not in operated position and do not have therefore a connection through their respective rectifiers 58 to the side circuit 54. When any of the operators at the other stations lift their handpieces to close the respective branch communication circuits, these other relays will not operate on the alternating current supplied thereto and stay therefore in unoperated position. The operators at the remote stations therefore merely obtain connection to the A.-C. signal source via the condensers shunting the respective station relays and will receive a heavy signal in their receivers to apprise them that the machine is in use. For instance, say that the operator at station 11*b* lifts his handpiece while the operator at station 11*c* is using the machine. On lifting his handpiece he closes the branch communication circuit 21*b* and provides a completed circuit from the A.-C. source 28 through the transformer 29, switches 61 and 62, side circuit 54, respective line of the conductor group 57 going to the relay pole 51*b* and the other respective line of conductor group 57 going through the condenser 56*b* and resistor 55*b* to the relay pole 52*b*, the branch communication circuit 21*b*, and the station switch and receiver of station 11*b*. He receives therefore only a heavy warning signal which will be reproduced by his receiver to apprise him that the machine is not available to him for his own use. Complete privacy is therefore afforded to the user of the system.

When the user at station 11*a* closes his switch 34*a* he places his carbon-button microphone in parallel with the resistor 37*a* to step up the level of the current in the audio circuit to that at which the relay 23 is operated. This causes the clutch 15 to start record rotation for dictation-recording purposes. The switch 34*a* is therefore a start-stop control for recording purposes.

When the user closes his switch 43*a*, an energizing circuit for the relay 44 is completed from the positive side of the D.-C. source 25 to the top side of the signal circuit 30, then through one line of the branch signaling circuit 30*a* to the switch 43*a* and back through this switch and the lower section of station switch 38*a*, negative side of branch communication circuit 21*a*, pole 52*a* and negative side of the audio circuit 21 to the negative side of the D.-C. source 25. As the relay 44 is operated, the switch 45 is moved to connect the reproducer 48 to the audio circuit and, at the same time, the clutch 15 is engaged via the tie line 44*a*. This places the machine in operation for playback.

The dictating system shown in Figure 2 is the same in all details as that shown in Figure 1 except for the connections of the branch signaling circuits. Since the components and major circuits operate the same as before, analogous components and circuits are given the same reference characters.

The major distinction in the embodiment of Figure 2 is that all branch signaling circuits are connected permanently to the side circuit 54 instead of to the main signaling circuit 30. By so doing two wires are eliminated between the relay station 49 and the attendant's station 10, leaving only four wires consisting of the main circuit 21 and the side circuit 54. Similarly, the bus wire group between the station relays 50 of the relay station 49, which group is now referred to as 570, is reduced to four wires. An important advantage in having only four wires between the relay station and the attendant's station is that these stations can be interconnected through a standard telephone switchboard diagrammatically represented as 63.

The voltage for the D.-C. source 25 is typically about twenty-eight volts whereas that for the branch signaling circuits is only about fourteen volts. The greater voltage of the source 25 is desirable initially in the side circuit for assuring fast operation of the respective station relay 59 when a handpiece is picked up at one of the remote stations, but in order that this higher voltage will not be applied to the respective signal lamp 42, a D.-C. voltage-cutdown device, referred to by the number 64 with the suffix letter of the respective station, is connected serially in each branch signaling circuit to prevent energization of the respective signal lamp from the D.-C. source 25. This may be a blocking device such as a condenser or a rectifier poled in opposition to the polarity of the D.-C. source 25. If a blocking condenser were used, it would have to have a large capacity in order to pass the A.-C. signaling current because of the low impedance of the signal lamp; preferably, therefore, a rectifier is used as shown.

When the circuit 30 becomes energized from the A.-C. source 28 through the transformer 29 in response to activation of the relay 22, the relay 59 is operated to connect the side circuit 54 to this circuit 30. The rectifiers 64 rectify the alternating current from the transformer 29 and cause the signal lamps 42 to operate on direct current. For better efficiency of rectification, a condenser, referred to by the number 65 with the suffix letter of the respective station, is connected across each branch signaling circuit, as shown.

The embodiments of my invention hereinabove described are intended to be illustrative and not necessarily limitative of my invention, since the same is subject to changes and modifications without departure from the scope of my invention, which I endeavor to express according to the following claims.

I claim:

1. In a remotely-controlled phonographic system including a D.-C. source of potential: the combination of an attendant's station including a phonographic machine; a plurality of remote operators' stations each including a transducer and a control switch for said machine; a branch communication circuit for each remote station serially including the respective control switch and transducer; an audio circuit for said machine connected to said D.-C. source; a side circuit connected to said D.-C. source; and a relay for each of said remote stations connected in said side circuit in parallel relation to each other, each of said station relays including switch means positioned normally to connect the respective branch communication circuit to said side circuit through the coil of the respective relay and operable to shift the connection of the respective branch communication circuit from said side circuit to said audio circuit and each of said station relays being energizable by said D.-C. source upon closure of the respective control switch to operate its said switch means.

2. The combination set forth in claim 1 including means effective while said respective control switch is closed for maintaining said operated station relay in operated position.

3. The combination set forth in claim 1 including a circuit rendered effective by said operated relay as the same is moved to operated position for supplying operating current to maintain said relay in operated position after said respective branch communication circuit is disconnected from said side circuit.

4. The combination set forth in claim 1 wherein each of said station relays is conditioned while in unoperated position for operation only from a D.-C. source of potential, including circuit means for each of said relays rendered effective upon operation of the relay to enable the relay to be maintained in operated position from a source of alternating current; and means responsive to energization of said audio circuit for supplying alternating current to said operated relay and to each of the other branch communication circuits.

5. The combination set forth in claim 1, wherein each of said station relays is adapted normally for operation only by direct current, including an A.-C. source of power, a control relay for said machine in said audio circuit operable by said D.-C. source of potential when said audio circuit is connected to said respective branch communication circuit; means controlled by said control relay for disconnecting said side circuit from said D.-C. source and for connecting the same to said A.-C. source as said audio circuit is energized; and respective rectifying means for said station relays rendered effective by said relays respectively for causing the operated relay to be maintained in operated position by said A.-C. source of power while the control switch at the respective remote station is closed.

6. In a remotely-controlled phonographic system including D.-C. and A.-C. sources of potential; the combination of an attendant's station including a phonographic machine having an audio circuit connected to said D.-C. source; a plurality of remote operators' stations each including a transducer, a signaling device and an on-off station switch for said machine; branch signaling circuits leading from the signaling devices of said remote stations respectively; branch communication circuits leading from said remote stations respectively and including the respective transducer and station switch; an audio circuit for said machine connected to said D.-C. source; a side circuit connected to said D.-C. source; a relay for each of said remote stations connected in said side circuit and including switch means normally positioned to connect the respective branch communication circuit to said side circuit and operable upon energization of the relay by said D.-C. source when the respective station switch of the remote station in use is closed to shift the connection of said branch communication circuit from said side circuit to said audio circuit; and means responsive to energization of said audio circuit for connecting said branch signaling circuits to said A.-C. source and for shifting said side circuit from said D.-C. source to said A.-C. source.

7. The combination set forth in claim 6 wherein said station relays are adapted to be operable only by direct current including condensers shorting said station relays respectively to enable passage of A.-C. warning signals from said A.-C. source to the branch communication circuits of the remote stations not in use whereby current from said A.-C. source is made available to all branch communication circuits as signaling current except to the branch communication circuit of the station in use; and a rectifier circuit for each of said station relays including a switch closable upon operation of the respective station relay for connecting that relay in said side circuit whereby said operated relay is held in operated position by current from said A.-C. source.

8. In a remotely-controlled phonographic system including D.-C. and A.-C. sources of potential: the combination of an attendant's station including a phonographic machine having an audio circuit connected to said D.-C. source; a plurality of remote operators' stations each including a transducer, a signaling device and an on-off station switch for said machine; branch signaling circuits leading from the signaling devices of said remote stations respectively; branch communication circuits leading from said remote stations respectively and including the respective transducer and station switch; an audio circuit for said machine connected to said D.-C. source; a side circuit connected to said D.-C. source and to each of said branch signaling circuits; voltage-cutdown devices effective as to direct current and connected respectively in said branch signaling circuits to prevent energization of said signaling devices by said D.-C. source; a relay for each of said remote stations including switch means normally positioned to connect the respective branch communication circuit to said side circuit through the coil of the respective relay and operable upon energization of the relay by said D.-C. source when the respective station switch of the remote station in us is operated to shift the connection of said branch communication circuit from said side circuit to said audio circuit; and means responsive to energization of said audio circuit for disconnecting said side circuit from said D.-C. source and for causing the side circuit to be energized by said A.-C. source.

9. The combination set forth in claim 8 wherein said D.-C. voltage-cutdown device is a rectifier poled in opposition to the polarity of said D.-C. source.

10. In a remotely-controlled phonographic system including D.-C. and A.-C. sources of potential: the combination of an attendant's station including a phonographic machine having an audio circuit connected to said D.-C. source; a plurality of remote operators' stations each including a transducer, a signaling device and an on-off station switch for said machine; branch signaling circuits leading from the signaling devices of said remote stations respectively; branch communication circuits leading from said remote stations respectively and serially including the respective transducer and station switch; an audio circuit for said machine connected to said D.-C. source; a side circuit connected to said D.-C. source and to each of said branch signaling circuits; voltage-cutdown devices effective as to direct current and connected respectively in said branch signaling circuits to prevent energization of said signaling devices by said D.-C. source; a D.-C. relay for each of said remote stations including switch means normally positioned to connect the respective branch communication circuit to said said circuit through the coil of the respective relay and operable upon energization of the relay by said D.-C. source when the respective station switch of a remote station in use is closed to shift the connection of said branch communication circuit from said side circuit to said audio circuit; means responsive to energization of said audio circuit for causing said side circuit to be energized by said A.-C. source; a rectifier circuit for each of said station relays including a switch closable upon operation of the respective station relay for connecting that relay across said side circuit to cause the operated relay to be maintained in operated position by current from said A.-C. source; and condensers shunting the coils of said station relays respectively for passing alternating current from said A.-C. source to the branch communication circuits of the respective stations not in use.

11. In a remotely-controlled phonographic system including a source of potential: the combination of an attendant's station including a phonographic machine, said machine having an audio circuit connected to said potential source; a side circuit connected to said potential source; a plurality of remote stations each provided with a transducer and an on-off station switch; relays in said side circuit for said remote stations respectively; circuit means including contacts of said relays for connecting said station switches in said side circuit via the coils and contacts of the respective station relays when the relays are not energized, each of said relays being energizable by said potential source upon operation of the respective station switch to "On" position; and means including contacts of said station relays effective upon energization of one of said relays to connect the respective station transducer to said audio circuit.

12. The combination set forth in claim 11 including a relay at said attendant's station; means to cause energization of said attendant's station relay upon connection of a station transducer to said audio circuit; and circuit means including switch contacts of said attendant's station relay for disconnecting said side circuit from said potential source while said attendant's station relay is energized.

13. The combination set forth in claim 12 including a holding circuit for each station relay including contacts of the relay and controlled by said attendant's station relay for maintaining the operated station relay in operated position after disconnection of said side circuit from said potential source so long as said attendant's station relay is energized.

14. In a remotely-controlled phonographic system including a source of potential: the combination of an attendant's station including a phonographic machine, said machine having an audio circuit connected to said potential source; a side circuit connected to said potential source; a plurality of remote stations each provided with a transducer and an on-off station switch; relays in said side circuit for said remote stations respectively; and respective circuit means for said remote stations each including switch means of the respective station relay positioned when the relay is not energized to connect the respective station switch through said side circuit and the coil of the relay to said potential source for energization of the relay when the station switch is in "on" position, and positioned when the relay is energized to connect the respective station switch and transducer to said audio circuit, including means effective upon energization of the relay for maintaining the energization thereof until the station switch is next returned to "off" position.

No references cited.